(12) United States Patent  
Gallo

(10) Patent No.: US 7,136,988 B2
(45) Date of Patent: Nov. 14, 2006

(54) MASS DATA STORAGE LIBRARY FRAME SPANNING FOR MIXED MEDIA

(75) Inventor: Frank David Gallo, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 311 days.

(21) Appl. No.: 10/678,892

(22) Filed: Oct. 3, 2003

(65) Prior Publication Data

US 2005/0076174 A1   Apr. 7, 2005

(51) Int. Cl.
G06F 12/02 (2006.01)
(52) U.S. Cl. ............................ 711/217; 711/4; 711/218
(58) Field of Classification Search ................ 711/112, 711/114, 4, 217, 218; 707/103, 205; 700/116; 709/223; 396/30, 178
See application file for complete search history.

(56) References Cited

U.S. PATENT DOCUMENTS

| | | | | |
|---|---|---|---|---|
| 4,310,883 | A | * | 1/1982 | Clifton et al. ............... 707/205 |
| 4,930,086 | A | * | 5/1990 | Fukasawa ..................... 700/116 |
| 5,164,909 | A | | 11/1992 | Leonhardt et al. |
| 5,416,914 | A | * | 5/1995 | Korngiebel et al. ......... 711/114 |
| 5,538,138 | A | * | 7/1996 | Reich .......................... 209/3.3 |
| 5,754,773 | A | | 5/1998 | Ozden et al. |
| 5,761,503 | A | | 6/1998 | Fisher |
| 5,845,083 | A | | 12/1998 | Hamadani et al. |
| 5,930,493 | A | | 7/1999 | Ottesen et al. |
| 5,940,610 | A | | 8/1999 | Baker et al. |
| 6,052,341 | A | * | 4/2000 | Bingham et al. ............ 711/112 |
| 6,092,080 | A | | 7/2000 | Gustman |
| 6,096,095 | A | | 8/2000 | Halstead |
| 6,205,093 | B1 | | 3/2001 | Abbott et al. |
| 6,353,831 | B1 | * | 3/2002 | Gustman ................. 707/103 R |
| 6,366,550 | B1 | * | 4/2002 | Shiba ..................... 369/178.01 |
| 6,385,145 | B1 | * | 5/2002 | Ostwald ................... 369/30.42 |
| 6,411,571 | B1 | * | 6/2002 | Mitsunari et al. ......... 369/30.31 |
| 6,430,611 | B1 | * | 8/2002 | Kita et al. ................... 709/223 |
| 6,434,090 | B1 | * | 8/2002 | Basham et al. ........... 369/30.31 |
| 6,473,706 | B1 | * | 10/2002 | Gallo et al. ................. 702/105 |
| 6,515,946 | B1 | * | 2/2003 | Morisaki ................. 369/30.55 |

* cited by examiner

Primary Examiner—Pierre Bataille
Assistant Examiner—Paul Schlie

(57) ABSTRACT

Disclosed are a system, a method, and an article of manufacture to provide for configuring an automated data storage library having one or more storage frames that operate with different types of data storage media. The automated data storage library is configured to operate with sequential storage shelf addresses assigned to consecutive storage frames that use the same type of data storage media. The storage frames that operate with different types of data storage media may be physically assembled in any order. The automated data storage library may be expanded by attaching storage frames that operate with different types of data storage media in any order while maintaining sequential storage shelf addresses that span across multiple library frames.

24 Claims, 4 Drawing Sheets

MASS DATA STORAGE LIBRARY FRAME SPANNING FOR MIXED MEDIA

FIELD OF THE INVENTION

The present invention relates to library systems for dynamic information storage or retrieval. More particularly, the invention provides for the efficient configuration of an automated data storage library containing mixed media storage frames.

BACKGROUND OF THE INVENTION

Automated data storage libraries are known for providing cost effective storage and retrieval of large quantities of data. The data is stored on data storage media that is typically contained within a cartridge and referred to as a data storage media cartridge. The media comprises magnetic media (such as magnetic tape or disks), optical media (such as optical tape or disks), electronic media (such as PROM, EEPROM, flash PROM, Compactflash™, Smartmedia™, Memory Stick™, etc.), or other suitable media. The data storage library contains data storage drives that store data to, and/or retrieve data from the data storage media. The cartridges are stored inside the library in storage shelves when not in use by the data storage drives. One or more robot accessors retrieve selected cartridges from the storage shelves and provide them to data storage drives. Generally, data storage libraries contain a large number of storage shelves to place the cartridges when the cartridges are not in use by a data storage drive. Each storage shelf that may contain a cartridge is referenced or located by the library by a storage shelf address. The data storage library typically includes control electronics that direct the accessors operation, communicate with the data storage drives and interface to one or more host computers to transfer commands and/or data between the host computer and the data storage library. Typically, data stored on data storage media of an automated data storage library, once requested, is needed quickly. Thus, it is desirable that an automated data storage library be maintained in an operational condition as much as possible, such as the well known "24×7×365" availability.

Various companies manufacture automated data storage libraries, and each company has libraries with different features. Early data storage libraries could only operate with a single host computer. Automated data storage libraries now offer the capability of sharing the entire library with a plurality of host computers. Any host computer that is attached to the library may obtain access to all, or part of the cartridges in the library. The IBM 3584 UltraScalable Tape Library is an example of a product that has the internal capability to allocate data storage drives and storage shelves to multiple host computers. The data storage library can be divided into one or more logical libraries, where the robotics and electronics are usually shared throughout the library; however, the storage shelves and data storage drives are assigned to one of the logical libraries and are not shared.

The library system can include several frames each storing different media types. In a mixed media library installation, each frame supports only one media type. The installation order of the frames is not limited thereby presenting a difficulty when a logical library spans from one frame to a subsequent frame where an intervening frame supporting a different media type is being used. Storage shelf addresses are typically assigned in sequential order as storage shelves are encountered within each frame. For example, if each frame contains 100 storage shelves, and there are four frames in a library, the storage shelf address range of frame number one could be from one to 100. The storage shelf address range of frame two would then be from 101 to 200 and so on, with all of the four frames each handling 100 storage shelves up to frame four. The host computer cannot use the data storage library if there is a gap in the storage shelf range. This physical arrangement of storage shelves can further be broken down into multiple logical libraries wherein of the 400 storage shelves described above, logical library one may include the range of elemental addresses from 1 to 50. Logical library two handles the elemental address range from 51 to 300 and logical library three could handle elemental addresses from 301 to 400. The host computer operates the three logical libraries as three different libraries even though they are enclosed within one physical structure.

The present invention solves the problem where, for example, frames one and three are of one media type and frames two and four are of another media type. Storage shelf addresses in prior art systems are assigned in the sequential order of the frames and therefore a host in this example cannot use the storage shelves in frames one and three simultaneously as frame two consists of a different media type. For a host to contain more than the 100 storage shelves of this example available in frame one, a physical reconfiguration would be required to switch frames two and three thus providing up to 200 contiguous storage shelves of the same media type. Therefore, there is a need to configure a library system to operate with mixed media without requiring that the frames of the same media type be sequentially mounted.

SUMMARY OF THE INVENTION

In the present invention the storage addresses assigned to the storage shelves of the library frames are assigned such that all of frames with the same media type are assigned sequential storage shelf addresses. The storage shelves of the frames that use a first media type are assigned sequential storage addresses. The frames of the second media type are assigned sequential storage shelf addresses starting from a value that is greater than the storage shelf address of the last storage shelf of the previous frame that used the first media type. The frames of the next type of media can be handled in a like manner with the storage shelf addresses starting from a value that is greater than the storage shelf address of the last storage shelf of the previous frame that used the second media type. The assignment of storage shelf addresses is done without taking further memory system resources. In operation, the present invention performs an initial pass that detects the frame type in order to determine the frames supporting the first media type. The second media type storage shelf addresses start immediately after the reserved range for the first media type. Subsequent media types are handled in turn after the second media type and storage shelf addresses start immediately after the preceding media type. In effect, the storage shelf address range is spanned across intervening frames of the different media types. This is true no matter the number of frames or the order in which the frames are assembled. The number of storage shelf addresses and therefore the memory required to support the storage shelf addresses and the bandwidth required to transfer storage shelf addresses between systems is the same. This is important in the limited resource environment especially prevalent in the embedded systems area. Logical libraries can then be configured without impacting the ability of the handling and installation of the order of the frames in a mixed media library.

An object of the present invention, therefore, is to provide an improved method of configuring library systems containing mixed media types.

Another object of the present invention is to permit the addition of frames to a library system of different media types without physically rearranging the previously assembled frames in the library.

A further object of the present invention is to permit the configuration of logical libraries with sequential storage shelf addresses across library storage frames that can be physically attached in any order.

The foregoing and other features and advantages of the invention will be apparent from the following more particular description of preferred embodiments of the invention, as illustrated in the accompanying drawings.

DETAILED DESCRIPTION OF THE INVENTION

Referring to the illustrations, like numerals correspond to like parts depicted in the figures. The invention will be described as embodied in an automated magnetic tape library storage system for use in a data processing environment. Although the invention shown uses magnetic tape cartridges, one skilled in the art will recognize the invention equally applies to optical disk cartridges or other movable storage media and the use of either different types of cartridges or cartridges of the same type having different characteristics. Furthermore the description of an automated magnetic tape storage system is not meant to limit the invention to magnetic tape data processing applications as the invention herein can be applied to any media storage and cartridge handling systems in general.

This application is related to the U.S. Pat. No. 6,205,093 which issued on Mar. 20, 2001 to P. E. Abbott, et al and assigned to the assignee of the present invention entitled, "Read Only Input System Providing Control Information Encoded In A Bar Code Label For Automated Data Storage Library" which is hereby incorporated by reference.

Figure 1:
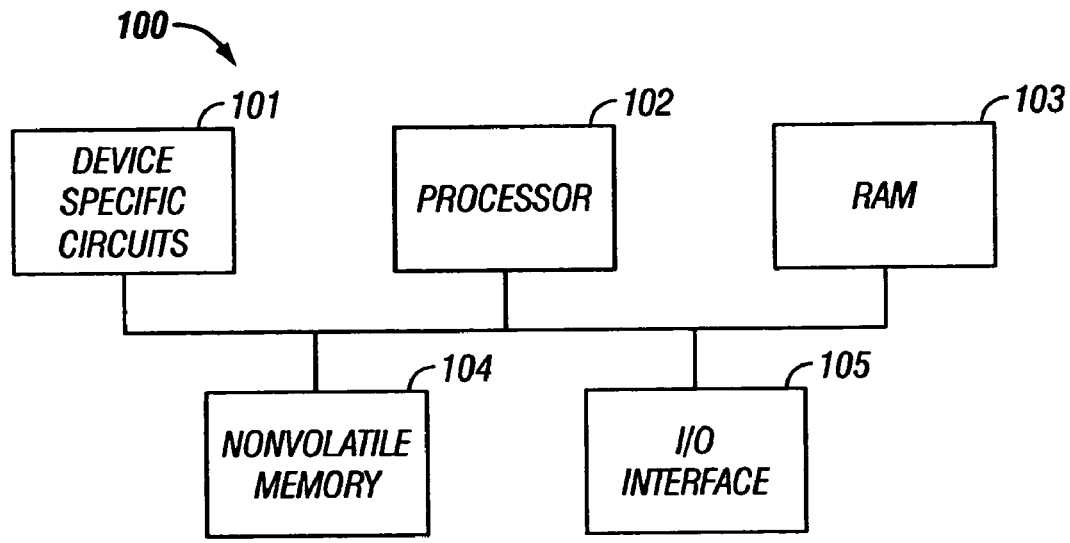
FIG. 1 is a block diagrammatic representation of an automated data storage library controller.

An automated data storage library typically contains one or more library controllers to direct the operation of the automated data storage library. The library controller may take many different forms and may comprise an embedded system, a distributed control system, a personal computer, workstation, etc. FIG. 1 shows a typical library controller 100 with a processor 102, RAM (Random Access Memory) 103, nonvolatile memory 104, device specific circuits 101, and I/O interface 105. Alternatively, the RAM 103 and/or nonvolatile memory 104 may be contained in the processor 102 as could the device specific circuits 101 and I/O interface 105. The processor 102 may comprise an off the shelf microprocessor, custom processor, FPGA (Field Programmable Gate Array), ASIC (Application Specific Integrated Circuit), discrete logic, etc. The RAM 103 is typically used to hold variable data, stack data, executable instructions, etc. The nonvolatile memory 104 may comprise any type of nonvolatile memory such as EEPROM (Electrically Erasable Programmable Read Only Memory), flash PROM (Programmable Read Only Memory), battery backup RAM, hard disk drive, etc. The nonvolatile memory 104 is typically used to hold the executable firmware and any nonvolatile data. The I/O interface 105 is a communication interface that allows the processor 102 to communicate with devices external to the controller. Examples may comprise serial interfaces such as RS-232 or USB (Universal Serial Bus), SCSI (Small Computer Systems Interface), FC-AL (Fibre Channel-Arbitrated Loop), etc. The device specific circuits 101 provide additional hardware to enable the library controller 100 to perform unique functions such as motor control of a cartridge gripper, etc. The device specific circuits 101 may comprise electronics that provide Pulse Width Modulation (PWM) control, Analog to Digital Conversion (ADC), Digital to Analog Conversion (DAC), etc. In addition, all or part of the device specific circuits 101 may reside outside the library controller 100.

Figure 2:
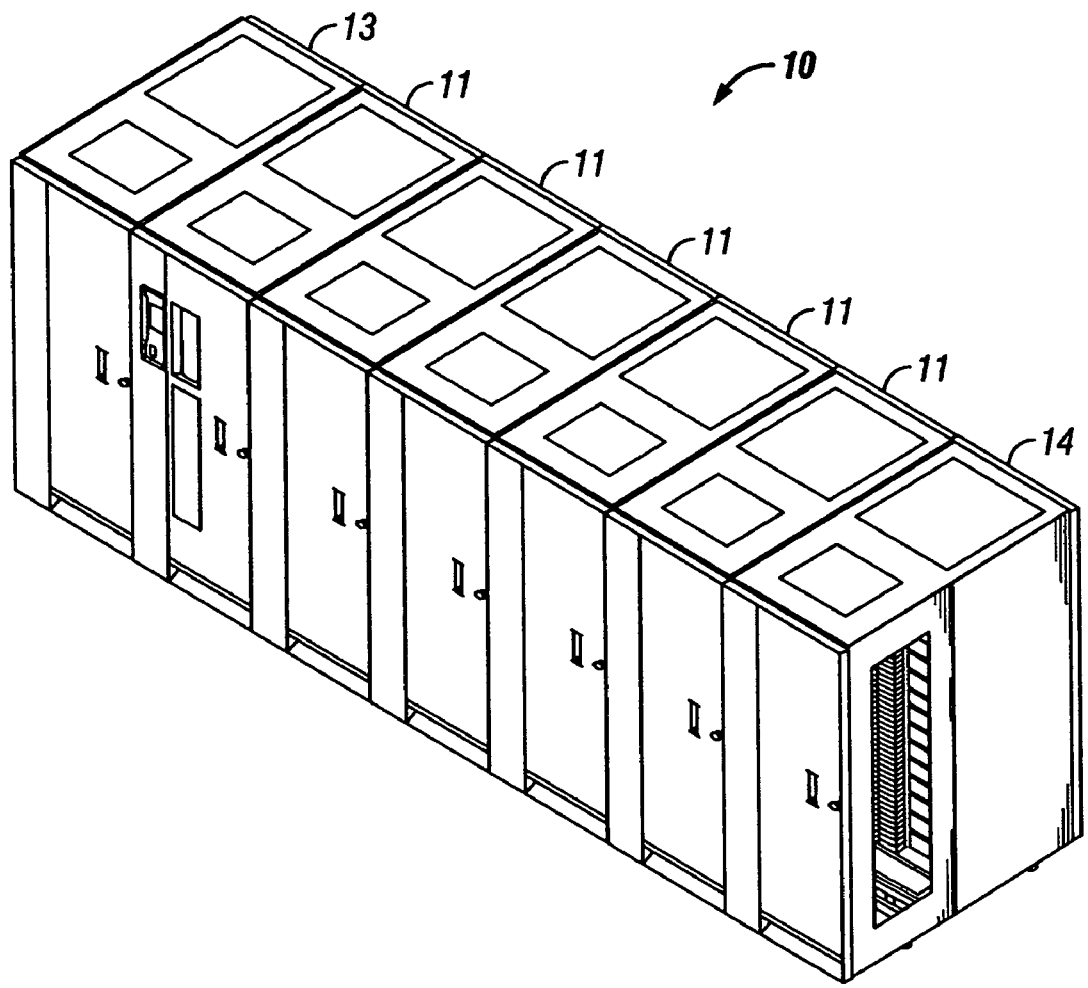
FIG. 2 illustrates an automated data storage library composed of a left hand service bay, multiple storage frames and a right hand service bay.
Figure 3:
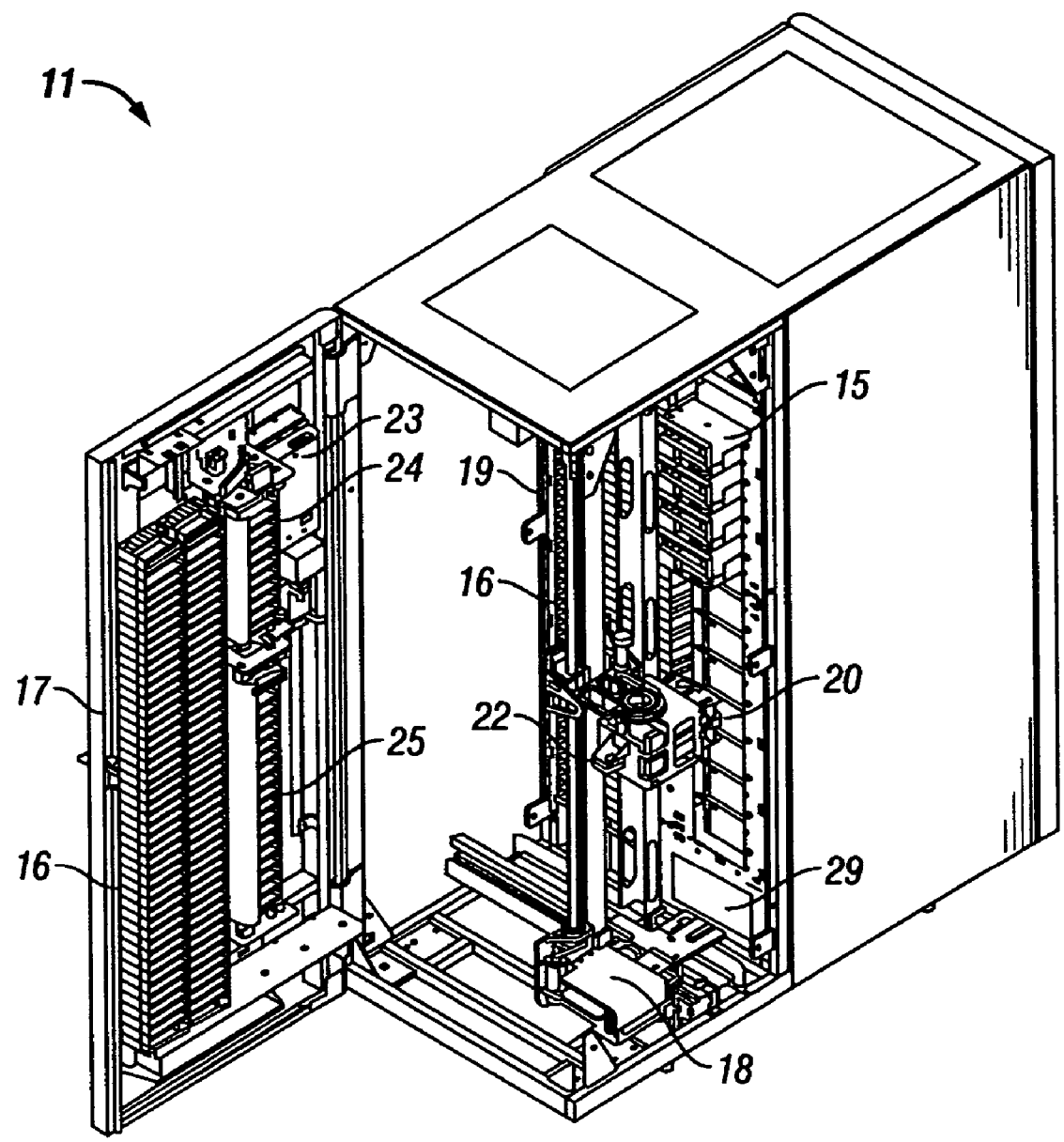
FIG. 3 shows the placement of a bar code label on one storage frame of a library.

FIG. 2 illustrates an automated data storage library 10 with left hand service bay 13, one or more storage frames 11, and right hand service bay 14. As will be discussed, a frame may comprise an expansion component of the library. Frames may be added or removed to expand or reduce the size and/or functionality of the library. Frames may comprise additional storage shelves, drives, import/export stations, accessors, operator panels, etc. FIG. 3 shows an example of a storage frame 11, which also is the minimum configuration of the library. In this minimum configuration, there is no service bay. The library is arranged for accessing data storage media (not shown) in response to commands from at least one external host system (not shown), and comprises a plurality of storage shelves 16, on front wall 17 and rear wall 19, for storing data storage cartridges that contain data storage media; at least one data storage drive 15 for reading and/or writing data with respect to the data storage media; and a first accessor 18 for transporting the data storage media between the plurality of storage shelves 16 and the data storage drive(s) 15. The storage frame 11 may optionally comprise an operator panel 23 or other user interface, such as a web-based interface, which allows a user to interact with the library. The storage frame 11 may optionally comprise an upper I/O station 24 and/or a lower I/O station 25, which allows data storage media to be inserted into the library and/or removed from the library without disrupting library operation. The library 10 may comprise one or more storage frames 11, each having storage shelves 16 accessible by first accessor 18. As described above, the storage frames 11, may be configured with different components depending upon the intended function. One configuration of storage frame 11 may comprise storage shelves 16, data storage drive(s) 15, and other optional components to store and retrieve data from the data storage cartridges. The first accessor 18 comprises a gripper assembly 20 for gripping one or more data storage media and may include a bar code scanner 22 or reading system, such as a smart card reader or similar system, mounted on the gripper 20, to "read" identifying information about the data storage media. A bar code label 29, containing encoded information is placed on storage frame 11. The encoded information contained in bar code label 29, may include information identifying characteristics of the storage frame, for example, media type, number of storage shelves, etc. Bar code label 29, may be read by bar code scanner 22, mounted on the gripper 20.

Figure 4:
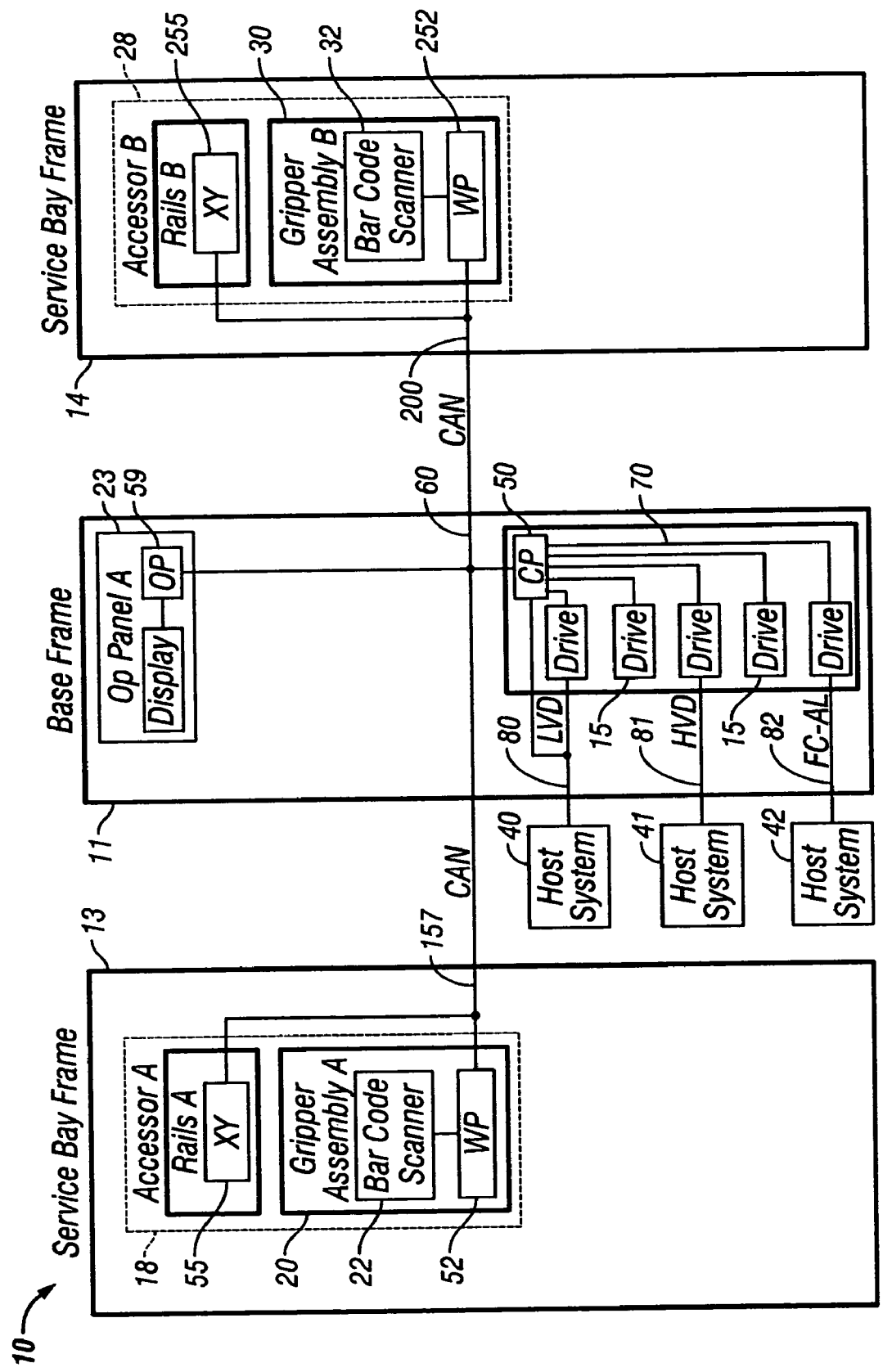
FIG. 4 illustrates an embodiment of a data storage library which employs a distributed system of modules with a plurality of processor nodes.

FIG. 4 illustrates an embodiment of a data storage library 10 of FIGS. 2 and 3, which employs a distributed system of modules with a plurality of processor nodes. An example of a data storage library which may implement the present invention is the IBM 3584 UltraScalable Tape Library. The library of FIG. 4 comprises one or more storage frames 11, a left hand service bay 13 and a right hand service bay 14.

The left hand service bay 13 is shown with a first accessor 18. As discussed above, the first accessor 18 comprises a gripper assembly 20 and may include a reading system 22 to "read" identifying information about the data storage media. The right hand service bay 14 is shown with a second accessor 28. The second accessor 28 comprises a gripper assembly 30 and may include a reading system 32 to "read" identifying information about the data storage media. In the event of a failure or other unavailability of the first accessor 18, or its gripper 20, etc., the second accessor 28 may perform all of the functions of the first accessor 18. The two accessors 18, 28 may share one or more mechanical paths or they may comprise completely independent mechanical paths. In one example, the accessors 18, 28 may have a common horizontal rail with independent vertical rails. The first accessor 18 and the second accessor 28 are described as first and second for descriptive purposes only, this description is not meant to limit either accessor to an association with either the left hand service bay 13, or the right hand service bay 14.

In the exemplary library, first accessor 18 or second accessor 28 moves its gripper in at least two directions, called the horizontal "X" direction and vertical "Y" direction, to retrieve and grip, or to deliver and release the data storage media at the storage shelves 16 and to load and unload the data storage media at the data storage drives 15.

The exemplary library 10 receives commands from one or more host systems 40, 41 or 42. The host systems, such as host servers, communicate with the library directly, e.g., on path 80, through one or more control ports (not shown), or through one or more data storage drives 15 on paths 81, 82, providing commands to access particular data storage media and move the media, for example, between the storage shelves 16 and the data storage drives 15. The commands are typically logical commands identifying the media and/or logical locations for accessing the media.

The exemplary library is controlled by a distributed control system receiving the logical commands from hosts, determining the required actions, and converting the actions to physical movements of first accessor 18 and/or second accessor 28.

In the exemplary library, the distributed control system comprises a plurality of processor nodes, each having one or more processors. In one example of a distributed control system, a communication processor node 50 may be located in a storage frame 11. The communication processor node provides a communication link for receiving the host commands, either directly or through the drives 15, via at least one external interface, e.g., coupled to line 80.

The communication processor node 50 may additionally provide a communication link 70 for communicating with the data storage drives 15. The communication processor node 50 may be located in the frame 11, close to the data storage drives 15. Additionally, in an example of a distributed processor system, one or more additional work processor nodes are provided, which may comprise, e.g., a work processor node 52 that may be located at first accessor 18, and that is coupled to the communication processor node 50 via a network 60, 157. Each work processor node may respond to received commands that are broadcast to the work processor nodes from any communication processor node, and the work processor node may also direct the operation of first accessor 18, providing move commands. An XY processor node 55 may be provided and may be located at an XY system of first accessor 18. The XY processor node 55 is coupled to the network 60, 157, and is responsive to the move commands, operating the XY system to position the gripper 20.

Also, an operator panel processor node 59 may be provided at the optional operator panel 23 for providing an interface for communicating between the operator panel and the communication processor node 50, the work processor node 52, and the XY processor node 55.

A network, for example comprising a common bus 60, is provided, coupling the various processor nodes. The network may comprise a robust wiring network, such as the commercially available CAN (Controller Area Network) bus system, which is a multi-drop network, having a standard access protocol and wiring standards, for example, as defined by CiA, the CAN in Automation Association, Am Weich Selgarten 26, D-91058 Erlangen, Germany. Other similar networks, such as Ethernet, or a wireless network system, such as RF or infrared, may be employed in the library as is known to those of skill in the art.

The communication processor node 50 is coupled to each of the data storage drives 15 of a storage frame 11, via lines 70, communicating with the drives and with host systems 40, 41 and 42. Alternatively, the host systems may be directly coupled to the communication processor node 50, at input 80 for example, or to control port devices (not shown) which connect the library to the host system(s) with a library interface similar to the drive/library interface. As is known to those of skill in the art, various communication arrangements may be employed for communication with the hosts and with the data storage drives. In the example of FIG. 4, host connections 80 and 81 are SCSI busses. Bus 82 comprises an example of a Fiber Channel-Aribitrated Loop which is a high speed serial data interface, allowing transmission over greater distances than the SCSI bus systems.

The data storage drives 15 may be in close proximity to the communication processor node 50, and may employ a short distance communication scheme, such as SCSI, or a serial connection, such as RS-422. The data storage drives 15 are thus individually coupled to the communication processor node 50 by means of lines 70.

Additional storage frames 11 may be provided and each is coupled to the adjacent storage frame. Any of the storage frames 11 may comprise communication processor nodes 50, storage shelves 16, data storage drives 15, and networks 60.

Further, the data storage library 10 may additionally comprise a second accessor 28, for example, shown in a right hand service bay 14 of FIG. 4. The second accessor 28 may comprise a gripper 30 for accessing the data storage media, and an XY system 255 for moving the second accessor 28 The second accessor 28 may run on the same horizontal mechanical path as first accessor 18, or on an adjacent path. The exemplary control system additionally comprises an extension network 200 forming a network coupled to network 60 of the storage frame(s) 11 and to the network 157 of left hand service bay 13.

In FIG. 4 and the accompanying description, the first and second accessors are associated with the left hand service bay 13 and the right hand service bay 14. This is for illustrative purposes and there may not be an actual association. In addition, network 157 may not be associated with the left hand service bay 13 and network 200 may not be associated with the right hand service bay 14.

In a first embodiment, the library is initially assembled with one or more storage frames 11 (FIGS. 2, 3, 4) After assembly the present invention is used to configure the library to operate as one or more logical libraries with mixed media. A flowchart of the steps to configure the library is shown in FIG. 5.

In a second embodiment, the library is expanded from an existing operating library. One or more storage frames 11 are attached to the existing library to increase the number of cartridges and/or to include addtional media types in the library. The present invention is used to configure the library to operate with mixed media and/or increased number of cartridges. In either embodiment the flowchart shown in FIG. 5 outlines the method used to configure the library.

Figure 5:
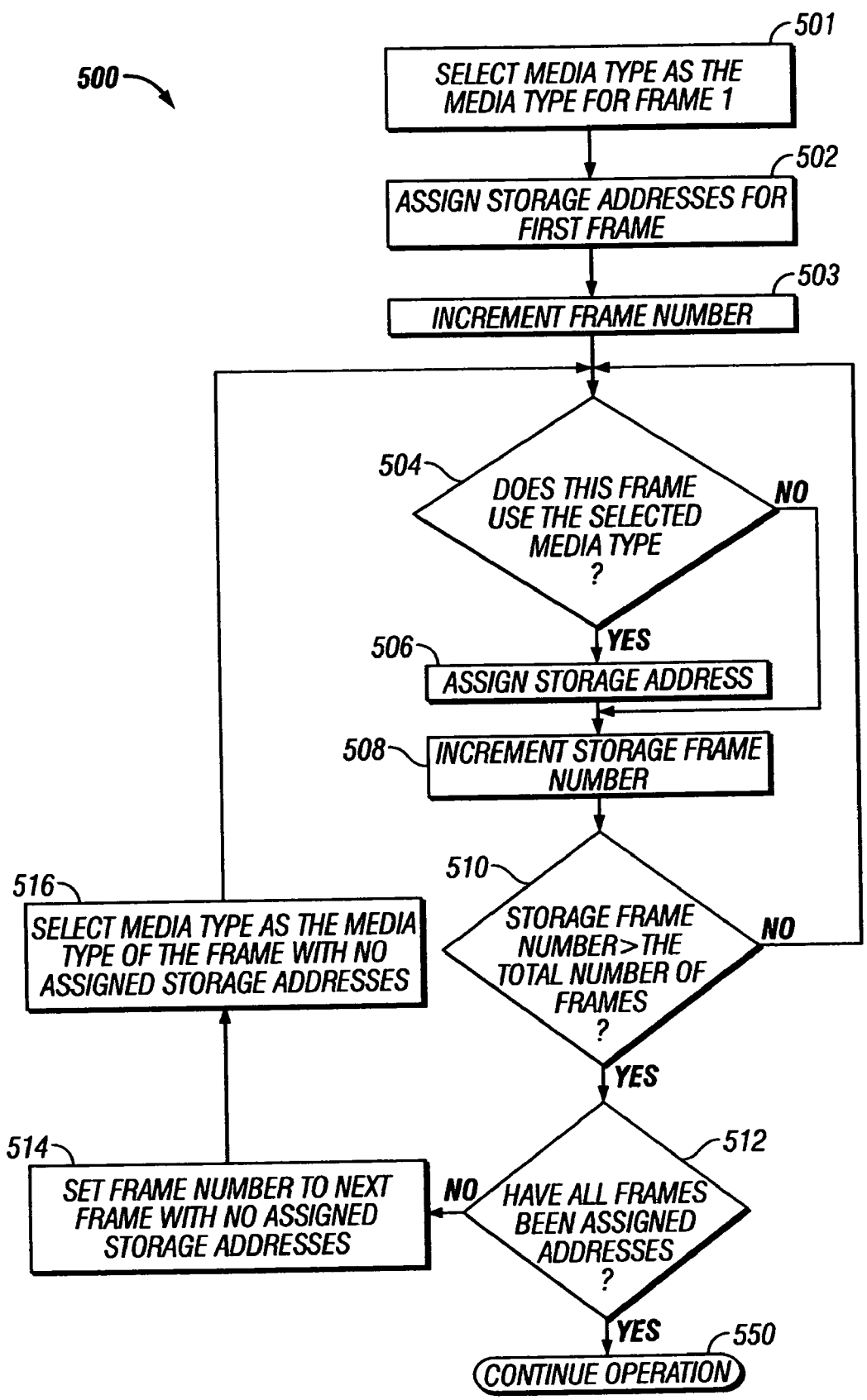
FIG. 5 is a flow chart showing the steps to configure an automated data storage library that contains storage frames with mixed media types.

An example to illustrate the use of the invention for a data storage library 10 that includes three frames is presented first before discussing the operation outlined in the flowchart of FIG. 5. For this example, frame one operates with Linear Tape Open (LTO) media and includes 400 storage cells addressed from 1 to 400. Frame two operates with Digital Linear Tape (DLT) based media and includes 300 storage cells addressed from 401 to 700. Frame three operates with LTO based media similar to that in frame one and includes 400 storage cells addressed from 701 to 1100. These three frames comprise one physical library. To operate correctly with the host computer connected to the library the address ranges for storage shelves must be contiguous and each logical library that is partitioned from the physical library may only operate with the same type of media. The library system in this example contains two media types, the LTO based media and the DLT based media. Because there are two types of media for this library system, it is necessary to partition the library system into at least two logical libraries. The first logical library partitioned could not include the first two frames because they contain different media types. It would be prohibitive in prior art systems to have the first logical library storage shelf range of 1 to 500 because it would span two different types of media. A logical library that contains storage shelves 1 to 400 and 701 to 800 could not operate in prior art systems because this range is not contiguous. As a result, given this configuration of frames, the library system could not have an LTO based media logical library containing 500 storage shelves, unless a fourth LTO based media frame is added. Using this invention, the library system may have an LTO logical library of 500 cells for instance, without adding frames or rearranging the existing frames of the library system.

In the prior art library systems the storage shelf addresses are assigned in a linear fashion in frame order. If frame one has 400 storage addresses, the first storage address in the frame is assigned address 1 and the last storage address is 400. Because there is a second frame installed, the first storage address assigned continues from where the previous frame leaves off and is assigned storage address 401. The last storage address in frame two is storage address 700. Similarly, frame three continues with 701 for the first storage address in the frame and the last storage address is 1100.

The present invention modifies the assignment of storage addresses for the storage shelves by groups with the assignment based on frame order by media type. The example given above is now configured using the present invention. Frame one starts the storage shelf address assignment and has the first storage address of 1 and the last storage address of 400. Because frame two does not use the same media type, it is bypassed and the process proceeds onto frame three. Because frame three also uses LTO media, the assignment of addresses is resumed and the first storage address for the first storage shelf in frame three is 401 and the last assigned address is 800. Because there are no additional frames containing LTO media in the library, the process returns to frame two because it is the first possible frame of the second media type. Because the media type is DLT, the second media type in the mixed media library, the storage addresses have yet to be assigned for this frame and so the addresses are assigned on the second pass of the address assignments. The process proceeds to assign addresses as the sequential address such that the first storage address in frame two is assigned address 801 while the last address is 1100. The process continues through the remaining frames of the library system to find other DLT based media frames. Because frame two is the only frame that uses DLT media the assignment of storage addresses is complete. If more DLT frames existed then storage address assignments would continue in a similar fashion. The result of the application of the present invention for this example is that frame one is configured with LTO media and the storage shelves of frame one have an address range from 1 to 400. Frame three is also configured with LTO media and the storage shelves of frame three have an address range from 401 to 800. Frame two is configured with DLT media and the storage shelves of frame two have an address range from 801 to 1100.

Flowchart 500 shown in FIG. 5 details the method steps to implement one embodiment of this invention. The method steps of flowchart 500 or the equivalent method steps could be executed by the library controller or other controller during the configuration of the library. The configuration of the library may occur after the initial assembly of the library, after a configuration change, after a maintenance or repair event or any other situation where the hardware or software of the library is affected. Each frame of the library will exist with a specified number of storage shelves 16. A bar code label 29, placed on storage frame 11 contains encoded information that identifies the number of storage shelves 16, the data storage media type and other configuration information for the frame. The encoded information contained in bar code label 29, may include information identifying characteristics of the storage frame, for example, media type, number of storage shelves, etc. Bar code label 29, may be read by bar code scanner 22, mounted on the gripper 20. Herein, bar code reader and bar code scanner refer to the same device.

Other memory devices may be placed on the storage frame to hold the encoded information necessary for the operation of the present invention. These other memory devices could be read by a compatible reading device under the control of library controller 100 in a similar manner as described for the bar code scanner 22.

At step 501 the media type of the first frame is selected. The process continues to step 502 where the starting storage address for the first storage shelf for the first frame is assigned. The starting storage address may be any number depending upon the desired configuration of the library. The starting storage address may be obtained from the encoded information on the bar code label by the controller directing the accessor to place the bar code reader in a position to read the bar code label on the first frame, and then extracting the starting address from the encoded information on the bar code label. The starting storage address may be obtained by alternative means, for example, from a memory device associated with the library controller, operator input, etc. The media type selected at step 501 may be obtained by the controller in the same manner as described above for the starting storage address. The process continues to step 503 where the frame number is incremented to the next frame. At decision step 504, the media type of the current frame (specified by the frame number) under examination is compared to the selected media type. If for this execution of step 504, the current frame is the second or greater frame and the media type of the current frame is the same as the media type selected for a prior frame, then step 506 is executed. If for this execution of step 504, the current frame is the second or greater frame and the media type of the current frame is different then the media type selected for a prior frame, then step 508 is executed. At step 506, storage addresses are assigned to each of the storage shelves 16 on the current frame. The assignment of storage addresses for each frame results in an address for each of the storage shelves 16 on the current frame. The address range of any frame will vary depending upon the size of the frame and the configuration of the frame. Each of the storage shelves 16 may or may not contain a data storage cartridge. All of the data storage cartridges for a frame will be of the same media type. The present invention is not limited to any specific media type and many different media types including different formats of magnetic tape cartridges, optical media cartridges, solid state memory cartridges, data storage media without cartridges, etc. are possible. After completion of step 506 or as a result of a "NO" result from step 504, the frame number is incremented at step 508 to direct the controller to examine the next frame in the sequence of frames. After the frame number is incremented at step 508, step 510 is executed to determine if the current frame number (specified by the frame number) is beyond the last frame number that exists for this library configuration. If the current frame number is greater than the total number of frames that exist for this library configuration then step 512 is executed. If the current frame number is not beyond the last frame then step 504 is executed again. At step 504 the media type of the current frame under examination is compared to the media type selected for a prior frame. The sequence of steps 504, 506, 508, and 510 assign sequential storage addresses to groups of library frames that are configured for the same media type. Each time step 506 is executed, the directory of the frames, storage shelves 16 and the storage addresses within the frames that is maintained by the library controller 100 is examined to determine the storage address of the last storage shelf of the previous frame that uses the same media type (selected media type) as the current frame. The storage address of the first storage shelf of the current frame is then assigned to be greater than the last storage shelf of the previous frame. In the preferred embodiment the storage address of the first storage shelf of the current frame is assigned to be one plus the address of the last storage shelf of the previous frame. The directory of the frames, storage shelves 16 and the storage addresses within the frames that is maintained by the library controller 100 is continually updated to reflect any changes as a result of the execution of any method steps of the present invention.

Step 512 is executed to determine if storage addresses have been assigned to all of the storage shelves 16 for all of the frames in the library. This can be accomplished by examining the directory of the frames, storage shelves 16 and the storage addresses within the frames that is maintained by the library controller 100. If all of the storage addresses have been assigned to all of the frames in the library then step 550 is executed resulting in a termination of the method steps and a return to normal operation of the library. If all of the storage addresses have not been assigned to all of the frames in the library then step 514 is executed. At step 514 the frame number is set to the next frame that doesn't have any assigned storage addresses for the storage shelves 16. This can be accomplished by examining the directory of the frames, storage shelves 16 and the storage addresses within the frames that is maintained by the library controller 100. The process then flows to step 516 where the media type is selected as the same media type of the frame determined in step 514. The process then flows back to step 504. The result of executing flowchart 500 is that sequential storage addresses are assigned to the storage shelves 16 on the frames that contain the same media type. Beginning with the first frame, all frames are examined to determine if they use the same media type as the first frame. After all storage addresses are assigned for the first media type, the remaining frames are examined to assign storage addresses to the frames that use the next media type. This process continues until all frames are assigned storage addresses for each media type in use. The result is sequential storage addresses for each media type that are independent of the physical order of the frames in the library.

An example of one possible configuration is now given to demonstrate the use of the invention using Flowchart 500 shown in FIG. 5. The configuration for this example is that frame one uses a LTO media type with 400 storage shelves. Frame two is configured for DLT media and 300 storage shelves. Frame three is of the same media as the first frame, the LTO media, with 400 storage shelves.

Flowchart 500 shown in FIG. 5 details the method steps to implement this example. At step 501 the media type of the first frame is selected as LTO media. The process continues to step 502 where the starting storage address for the first storage shelf for the first frame is assigned. The starting storage address for the first frame is assigned as address 1 at step 502. The starting storage address may be obtained from the encoded information on the bar code label placed on frame one or alternative means described above. The storage addresses are assigned to each of the storage shelves 16 on the current frame (frame one) with a range of 1–400. The result of the execution of step 502, is that the storage shelves 16 on frame one have an assigned address range of 1–400. A directory of the frames, storage shelves 16 and the storage addresses within the frames is maintained by the library controller 100.

The process continues to step 503 where the frame number is incremented to the next frame (frame two). At decision step 504, the media type of the current frame (frame two) under examination is compared to the selected media type (LTO). Step 504 is executed using frame two resulting in the execution of step 508 because the media type (DLT) of frame two is not the same as the selected media for the previous frame one (LTO). The frame number is incremented at step 508 to direct the controller to examine frame three and then step 510 is executed. At step 510, the "NO" decision is executed because frame three is not beyond the last frame in the library. Step 504 is executed again using frame three resulting in the execution of step 506 because the media type (LTO) of frame three is the same as the selected media type of the previous frame one (LTO). At step 506, storage addresses are assigned to each of the storage shelves 16 on frame three with a range of 401–800. After completion of step 506, the frame number is incremented at step 508 to direct the controller to examine frame four. At step 510, the "YES" decision is executed because frame four is beyond the last frame (three) in the library. From step 512, step 514 is executed because all of the frames have not been assigned storage addresses. At step 514 the frame number is set to frame two, because frame two doesn't have any assigned storage addresses to the storage shelves 16. The process then flows to step 516 where the media type is selected to be the same media type as frame two. The process then flows back to step 504. Step 504 is executed again using frame two resulting in the execution of step 506 because the media type (DLT) of frame two is the same as the selected media type from step 516. At step 506, storage addresses are assigned to each of the storage shelves 16 on frame two with a range of 801–1100.

The frame number is incremented at step 508 to direct the controller to examine frame three. At step 510, the "NO" decision is executed because frame three is not greater than the total number of frames in the library. Step 504 is executed again using frame three resulting in the execution of step 508 because the media type (LTO) of frame three is not the same as the selected media (DLT) for the previous frame (two). The frame number is incremented at step 508 to direct the controller to examine frame four. At step 510, the "YES" decision is executed because frame four is beyond the last frame (three) in the library. From step 512, step 550 is executed and the method steps end because all of the frames have been assigned storage addresses.

The result of executing flowchart 500 for this example is that frame one is configured with LTO media and the storage shelves of frame one have an address range from 1 to 400. Frame three is also configured with LTO media and the storage shelves of frame three have an address range from 401 to 800. Frame two is configured with DLT media and the storage shelves of frame two have an address range from 801 to 1100.

The library can now be used in a more efficient manner with the continues address configuration. As a result of the use of the present invention the library of this example could be configured as three logical libraries with storage address of 1–400 for the first logical library with LTO media, 401–800 for the second logical library with LTO media and 801–1100 for the third logical library with DLT media. Alternatively the library of this example could be configured as two logical libraries with storage address of 1–800 for the first logical library with LTO media and 801–1100 for the second logical library with DLT media. This results in configuring the automated data storage library into multiple logical libraries where each logical library comprises consecutive frames configured for the same media type.

Another example of the use of this invention is now described for the expansion of an existing library system. In this example the configuration of the example described above is modified by the addition of an additional library frame configured to use DLT media. Prior to this invention, the library system would have to be rebuilt to physically arrange the frames of the library to assure that enough contiguous storage shelves of a particular media type are provided. For this example, without this invention, two DLT frames must be physically attached adjacent to each other. With this invention, the new DLT frame can be added anywhere to the library. By using this invention, the library may be reconfigured by simply attaching an additional DLT media type frame on the end of the library. This invention will provide all of the DLT storage addresses in a contiguous arrangement even though the DLT frames were not placed adjacent to each other.

The configuration for this example is that frame one uses a LTO media type with 400 storage shelves. Frame two is configured for DLT media and 300 storage shelves. Frame three uses LTO media, with 400 storage shelves. Frame four is configured for DLT media with 300 storage shelves.

Flowchart 500 shown in FIG. 5 details the method steps to implement this example. At step 501 the media type of the first frame is selected as LTO media. The process continues to step 502 where the starting storage address for the first storage shelf for the first frame is assigned. The starting storage address for the first frame is assigned as address 1 at step 502. The starting storage address may be obtained from the encoded information on the bar code label placed on frame one or alternative means described above. The storage addresses are assigned to each of the storage shelves 16 on the current frame (frame one) with a range of 1–400. The result of the execution of step 502, is that the storage shelves 16 on frame one have an assigned address range of 1–400. A directory of the frames, storage shelves 16 and the storage addresses within the frames is maintained by the library controller 100.

The process continues to step 503 where the frame number is incremented to the next frame (frame two). At decision step 504, the media type of the current frame (frame two) under examination is compared to the selected media type. Step 504 is executed using frame two resulting in the execution of step 508 because the media type (DLT) of frame two is not the same as the selected media for the previous frame one (LTO). The frame number is incremented at step 508 to direct the controller to examine frame three and then step 510 is executed. At step 510, the "NO" decision is executed because frame three is not beyond the last frame in the library. Step 504 is executed again using frame three resulting in the execution of step 506 because the media type (LTO) of frame three is the same as the selected media type of the previous frame one (LTO). At step 506, storage addresses are assigned to each of the storage shelves 16 on the frame three with a range of 401–800. After completion of step 506, the frame number is incremented at step 508 to direct the controller to examine frame four.

At step 510, the "NO" decision is executed because frame four is not beyond the last frame in the library. Step 504 is executed again using frame four resulting in the execution of step 508 because the media type (DLT) of frame four is not the same as the selected media for the previous frame (one). The frame number is incremented at step 508 to direct the controller to examine frame five. At step 510, the "YES" decision is executed because frame five is beyond the last frame (four) in the library. From step 512, step 514 is executed because all of the frames have not been assigned storage addresses. At step 514 the frame number is set to frame two, because frame two doesn't have any assigned storage addresses to the storage shelves 16. The process then flows to step 516 where the media type is selected to be the same media type as frame two. The process then flows back to step 504. Step 504 is executed again using frame two resulting in the execution of step 506 because the media type (DLT) of frame two is the same as the selected media type from step 516. At step 506, storage addresses are assigned to each of the storage shelves 16 on frame two with a range of 801–1100.

The frame number is incremented at step 508 to direct the controller to examine frame three. At step 510, the "NO" decision is executed because frame three is not greater than the total number of frames in the library. Step 504 is executed again using frame three resulting in the execution of step 508 because the media type (LTO) of frame three is not the same as the selected media (DLT) for the previous frame (two). The frame number is incremented at step 508 to direct the controller to examine frame four. At step 510, the "NO" decision is executed because frame four is not beyond the last frame in the library. Step 504 is executed again using frame four resulting in the execution of step 506 because the media type (DLT) of frame four is the same as the selected media type of the previous frame (two). At step 506, storage addresses are assigned to each of the storage shelves 16 on the frame four with a range of 1101–1400. After completion of step 506, the frame number is incremented at step 508 to direct the controller to examine frame five. At step 510, the "YES" decision is executed because frame five is beyond the last frame (four) in the library. From step 512, step 550 is executed and the method steps end because all of the frames have been assigned storage addresses.

The result of executing flowchart 500 for this example is that frame one is configured with LTO media and the storage shelves of frame one have an address range from 1 to 400. Frame three is also configured with LTO media and the storage shelves of frame three have an address range from 401 to 800. Frame two is configured with DLT media and the storage shelves of frame two have an address range from 801 to 1100. Frame four is configured with DLT media and the storage shelves of frame four have an address range from 1101 to 1400.

The library can now be used in a more efficient manner with the continues address configuration. As a result of the use of the present invention the library of this example could be configured as four logical libraries with storage address of 1–400 for the first logical library with LTO media, 401–800 for the second logical library with LTO media, 801–1100 for the third logical library with DLT media and 1101–1400 for the forth logical library with DLT media. The library of this example could also be configured as two logical libraries with storage address of 1–800 for the first logical library with LTO media, 801–1400 for the second logical library with DLT media. This results in configuring the automated data storage library into multiple logical libraries where each logical library comprises consecutive frames configured for the same media type. Alternatively the library of this example could be configured as three logical libraries with storage address of 1–800 for the first logical library with LTO media, 801–1100 for the second logical library with DLT media and 1101–1400 for the third logical library with DLT media or as three logical libraries with storage address of 1–400 for the first logical library with LTO media, 401–800 for the second logical library with LTO media, 801–1400 with DLT media for the third logical library.

The principles of the present invention now have been made clear in the illustrated embodiments. They will be immediately obvious to those skilled in the art, many modifications of structure, arrangement, proportions, elements, materials and components used in the practice of the invention. For instance there are other types of cartridges or cassettes that could be used with the invention. The invention should not be limited to magnetic tapes and drives. For purposes of discussion of this invention, only magnetic tapes are shown each containing different media types. But it should be obvious that the different media types may be tape cartridges and optical cartridges, for instance, each of the different needs contained are intermixed within a library. The appended claims are, therefore, intended to cover and embrace any such modifications within the true spirit and scope of the invention.

What is claimed is:

1. A method for configuring an automated data storage library having one or more storage frames, each said storage frame having a plurality of storage shelves, wherein said method comprises the steps of:
   (A) selecting a media type of a first storage frame;
   (B) assigning storage addresses for said plurality of storage shelves in said first storage frame;
   (C) incrementing a storage frame number;
   (D) in response to detecting said selected media type in a storage frame specified by said storage frame number; assigning storage addresses for said plurality of storage shelves in said storage frame specified by said storage frame number;
   (E) incrementing said storage frame number;
   (F) in response to detecting that said storage frame number is not greater than a total number of storage frames, returning to step D;
   (G) in response to detecting that storage addresses have not been assigned to said plurality of storage shelves in all of said storage frames:
      setting said storage frame number to the next frame with no assigned storage addresses;
      selecting a media type of said next frame with no assigned storage addresses;
      returning to step D;
   (H) resuming operation of said automated data storage library.

2. The method of claim 1, wherein the assigning of storage addresses sub-step of step D further comprises the steps of:
   (A) determining the storage address of the last storage shelf of the previous storage frame containing said selected media type;
   (B) assigning a storage address for a first storage shelf of said storage frame specified by said storage frame number that is greater than said storage address of the last storage shelf of the previous storage frame containing said selected media type.

3. The method of claim 2, wherein step B further comprises the step of:
   assigning said storage address for said first storage shelf of said storage frame specified by said storage frame number that is equal to one plus said storage address of the last storage shelf of the previous storage frame containing said selected media type.

4. The method of claim 1, further comprising the step of:
   assigning consecutive storage addresses to said storage shelves of consecutive storage frames configured for the same media type.

5. The method of claim 1, wherein said automated data storage library further comprises at least one accessor, a bar code reader mounted on said accessor, a library controller for operating said automated data storage library, said library controller coupled to said bar code reader for detecting the output of said bar code reader and coupled to said accessor for operating said accessor and a bar code label positioned on said one or more storage frames for reading by said bar code reader, said bar code label comprising encoded information for Identifying said media type for said one or more storage frames, wherein said method comprises the additional steps of:
   (A) moving said bar code reader to one or more of said storage frames;
   (B) reading said bar code label positioned on said one or more storage frames;

(C) selecting said media type for said one or more storage frames by decoding said encoded information.

6. The method of claim 1, comprising the additional step of:
configuring said automated data storage library into multiple logical libraries wherein each said logical library comprises one or more storage frames configured for the same media type.

7. The method of claim 1, comprising the additional step of:
constructing a directory of information identifying said media type for said one or more storage frames.

8. The method of claim 1, comprising the additional step of:
constructing a directory of information identifying said storage addresses for said storage shelves for said one or more storage frames.

9. An automated data storage library comprising:
one or more storage frames, each said storage frame having a plurality of storage shelves;
at least one accessor;
a bar code reader mounted on said accessor;
a library controller for operating said automated data storage library, said library controller coupled to said bar code reader for detecting the output of said bar code reader and coupled to said accessor for operating said accessor;
a bar code label positioned on said one or more storage frames for reading by said bar code reader, said bar code label comprising encoded Information for Identifying a media type for said one or more storage frames;
wherein said controller is programed to perform method steps comprising:
(A) selecting a media type of a first storage frame;
(B) assigning storage addresses for said plurality of storage shelves in said first storage frame;
(C) incrementing a storage frame number;
(D) in response to detecting said selected media type in a storage frame specified by said storage frame number:
assigning storage addresses for said plurality of storage shelves in said storage frame specified by said storage frame number;
(E) incrementing said storage frame number;
(F) in response to detecting that said storage frame number is not greater than a total number of storage frames, returning to step D;
(G) in response to detecting that storage addresses have not been assigned to said plurality of storage shelves in all of said storage frames:
selling said storage frame number to the next frame with no assigned storage addresses;
selecting a media type of said next frame with no assigned storage addresses;
Returning to step D;
(H) resuming operation of said automated data storage library.

10. The automated data storage library of claim 9, wherein the assigning of storage addresses sub-step of step D further comprises the steps of:
(A) determining the storage address of the last storage shelf of the previous storage frame containing said selected media type;
(B) assigning a storage address for a first storage shelf of said storage frame specified by said storage frame number that is greater than said storage address of the last storage shelf of the previous storage frame containing said selected media type.

11. The automated data storage library of claim 10, wherein step B further comprises the step of:
assigning said storage address for said first storage shelf of said storage frame specified by said storage frame number that is equal to one plus said storage address of the last storage shelf of the previous storage frame containing said selected media type.

12. The automated data storage library of claim 9, wherein said controller is programmed to perform the additional method step comprising:
assigning consecutive storage addresses to said storage shelves of consecutive storage frames configured for the same media type.

13. The automated data storage library of claim 9, wherein said controller is programmed to perform additional method steps comprising:
(A) moving said bar code reader to one or more of said storage frames;
(B) reading said bar code label positioned on said one or more storage frames;
(C) selecting said media type for said one or more storage frames by decoding said encoded information.

14. The automated data storage library of claim 9, wherein said controller is programmed to perform the additional method step comprising:
configuring said automated data storage library into multiple logical libraries wherein each said logical library comprises one or more storage frames configured for the same media type.

15. The automated data storage library of claim 9, wherein said controller is programmed to perform the additional method step comprising:
constructing a directory of information identifying said media type for said one or more storage frames.

16. The automated data storage library of claim 9, wherein said controller is programmed to perform the additional method step comprising:
constructing a directory of information identifying said storage addresses for said storage shelves for said one or more storage frames.

17. An article of manufacture comprising a data storage medium tangibly embodying a program of machine-readable instructions executable by a digital processing apparatus to perform method steps for configuring an automated data storage library having one or more storage frames, each said storage frame having a plurality of storage shelves, said method steps comprising:
(A) selecting a media type of a first storage frame;
(B) assigning storage addresses for said plurality of storage shelves in said first storage frame;
(C) Incrementing a storage frame number;
(D) in response to detecting said selected media type in a storage frame specified by said storage frame number:
assigning storage addresses for said plurality of storage shelves in said storage frame specified by said storage frame number;
(E) incrementing said storage frame number;
(F) in response to detecting that said storage frame number is not greater than a total number of storage frames, returning to step D;
(G) in response to detecting that storage addresses have not been assigned to said plurality of storage shelves in all of said storage frames:
setting said storage frame number to the next frame with no assigned storage addresses;
selecting a media type of said next frame with no assigned storage addresses;

Returning to step D;

(H) resuming operation of said automated data storage library.

18. The article of manufacture of claim 17, wherein the assigning of storage addresses sub-step of step D further comprises the steps of:

(A) determining the storage address of the last storage shelf of the previous storage frame containing said selected media type;

(B) assigning a storage address for a first storage shelf of said storage frame specified by said storage frame number that is greater than said storage address of the last storage shelf of the previous storage frame containing said selected media type.

19. The article of manufacture of claim 18, wherein step B further comprises the step of:

assigning said storage address for said first storage shelf of said storage frame specified by said storage frame number that is equal to one plus said storage address of the last storage shelf of the previous storage frame containing said selected media type.

20. The article of manufacture of claim 17, wherein said method steps further comprise the step of:

assigning consecutive storage addresses to said storage shelves of consecutive storage frames configured for the same media type.

21. The article of manufacture of claim 17, wherein said automated data storage library further comprises at least one accessor, a bar code reader mounted on said accessor, a library controller for operating said automated data storage library, said library controller coupled to said bar code reader for detecting the output of said bar code reader and coupled to said accessor for operating said accessor and a bar code label positioned on said one or more storage frames for reading by said bar code reader, said bar code label comprising encoded information for identifying said media type for said one or more storage frames and wherein said method steps further comprise the steps of:

(A) moving said bar code reader to one or more of said storage frames;

(B) reading said bar code label positioned on said one or more storage frames;

(C) selecting said media type for said one or more storage frames by decoding said encoded information.

22. The article of manufacture of claim 17, wherein said method steps further comprise the step of:

configuring said automated data storage library into multiple logical libraries wherein each said logical library comprises one or more storage frames configured for the same media type.

23. The article of manufacture of claim 17, wherein said method steps further comprise the step of:

constructing a directory of information identifying said media type for said one or more storage frames.

24. The article of manufacture of claim 17, wherein said method steps further comprise the step of:

constructing a directory of information identifying said storage addresses for said storage shelves for said one or more storage frames.

* * * * *